(12) United States Patent
Shimizu et al.

(10) Patent No.: US 8,048,948 B2
(45) Date of Patent: Nov. 1, 2011

(54) FILLER-DISPERSED MELT-KNEADED PRODUCTS, MOLDED RESIN PRODUCTS THEREOF, AND PRODUCTION METHOD THEREOF

(75) Inventors: Hiroshi Shimizu, Tsukuba (JP); Yongjin Li, Tsukuba (JP); Li Zhao, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 582 days.

(21) Appl. No.: 12/118,677

(22) Filed: May 9, 2008

(65) Prior Publication Data

US 2008/0318318 A1 Dec. 25, 2008

(30) Foreign Application Priority Data

Jun. 22, 2007 (JP) .................................. 2007-164489
May 2, 2008 (JP) .................................. 2008-120781

(51) Int. Cl.
*C08K 3/34* (2006.01)
*C08L 67/04* (2006.01)
(52) U.S. Cl. ........ 524/445; 524/442; 524/449; 524/502; 524/513; 524/514; 524/538; 524/539
(58) Field of Classification Search .................. 524/442, 524/445, 449, 502, 513, 514, 538, 539
See application file for complete search history.

(56) References Cited

U.S. PATENT DOCUMENTS 5,135,627 A 8/1992 Soane

FOREIGN PATENT DOCUMENTS

| DE | 4236935 A1 | 5/1995 |
|----|------------|--------|
| JP | H07-102175 A1 | 4/1995 |
| JP | 2000-001612 A1 | 1/2000 |
| JP | 2005-313608 A1 | 11/2005 |
| JP | 2006-21195 A1 | 1/2006 |
| JP | 2006-136673 A1 | 6/2006 |
| JP | 2006-306983 A1 | 11/2006 |

OTHER PUBLICATIONS

Sandra Steinmann, Wolfram Gronski, Christian Friedrich, "Influence of selective filling on rheological properties and phase inversion of two-phase polymer blends", Polymer, 2002, 43, p. 4467-4477.
F.Gubbels, S.Blacher, E.Vanlathem, R.Jerome, R.Deltour, F.Brouers, Ph.Teyssie, "Design of Electrical Conductive Composites: Key Role of the Morphology on the Electrical Properties of Carbon Black Filled Polymer Blends", Machomolecules, 1995, 28, p. 1559-1566.
Yongjin Li, Hiroshi Shimizu, "Novel Morphologies of poly(phenylene oxide) (PPO)/polyamide 6 (PA6) blend nanocomposites", Polymer, 2004, 45, p. 7381-7388.

(Continued)

*Primary Examiner* — Ana Woodward
(74) *Attorney, Agent, or Firm* — Law Office of Katsuhiro Arai

(57) ABSTRACT

A melt-kneading method for filling material-containing resin or elastomer includes: a step of preparing a filling material as a filler and a resin or elastomer comprising an incompatible blend; and a step of introducing the filling material-containing resin or elastomer into a material feed part provided at an end of a cylindrical melt-kneading part having a heater and provided with a screw, and then melt-kneading the filling material-containing resin or elastomer under conditions where the rotation speed of the screw is about 600 rpm to about 3,000 rpm and its shear rate is about 900 to about 4,500 $sec^{-1}$, thereby forming a co-continuous structure comprising the incompatible blend.

19 Claims, 7 Drawing Sheets

OTHER PUBLICATIONS

Yongjin Li, Hiroshi Shimizu, "Co-continuous Polyamide 6 (PA6)/Acrylonitrile-Butadiene-Styrene (ABS) Nanocomposites", Macromolecular Rapid Communication, 2005, 26, p. 710-715.

Petra.Potschke, Donald.R.Paul, "Detection of Co-Continuous Structures in SAN/PA6 Blends by Different Methods", Macromolecular Symposium, 2003, 198, p. 69-81.

Mohamed Jaziri, Tasnim Kossentini Kallel, Souad Mbarek, Boubaker Elleuch, "Morphology development in polyethylene/polystyrene blends: the influence of processing conditions and interfacial modification", Polymer International, 2005, 54, p. 1384-1391.

Hiroshi Shimizu, Yongjin Li, Akira Kaito, Hironari Sano, "Formation of Nanostructred PVDF/PA11 Blends Using High-Shear Processing", Macromolecules, 2005, 35, p. 7880-7882.

Hiroshi Shimizu, Yongjin Li, Akira Kaito, Hironari Sano, "High-Shear Effects on the Nano-Dispersed Structure of the PVDF/PA11 Blends", Journal of Nanoscience and Nanotechnology, 2006, vol. 6, p. 3923-3928.

Yongjin Li, Hiroshi Shimizu, Toshiaki Furumichi, Yoshiyuki Takahashi, Takeo Furukawa, "Crystal Forms and Ferroelectric Properties of Poly(vinylidene fluoride)/Polyamide 11 Blends Prepared by High-Shear Processing", Journal of Polymer Science: Part B: Polymer Physics, 2007, vol. 45, p. 2707-2714.

Hiroshi Shimizu, Yongjin Li, Li Zhao, "Co-continuous Structural Control of Biodegradable Polymer Blend/Clay Nanocomposites" Polymer Preprints, Japan, 2007, vol. 56.

Shimizu et al., "Co-continuous Structural Control of Biodegradable Polymer Blend/Clay Nanocomposites", Polymer Preprints, Japan, 2007, vol. 56., No. 1, May 10, 2007.

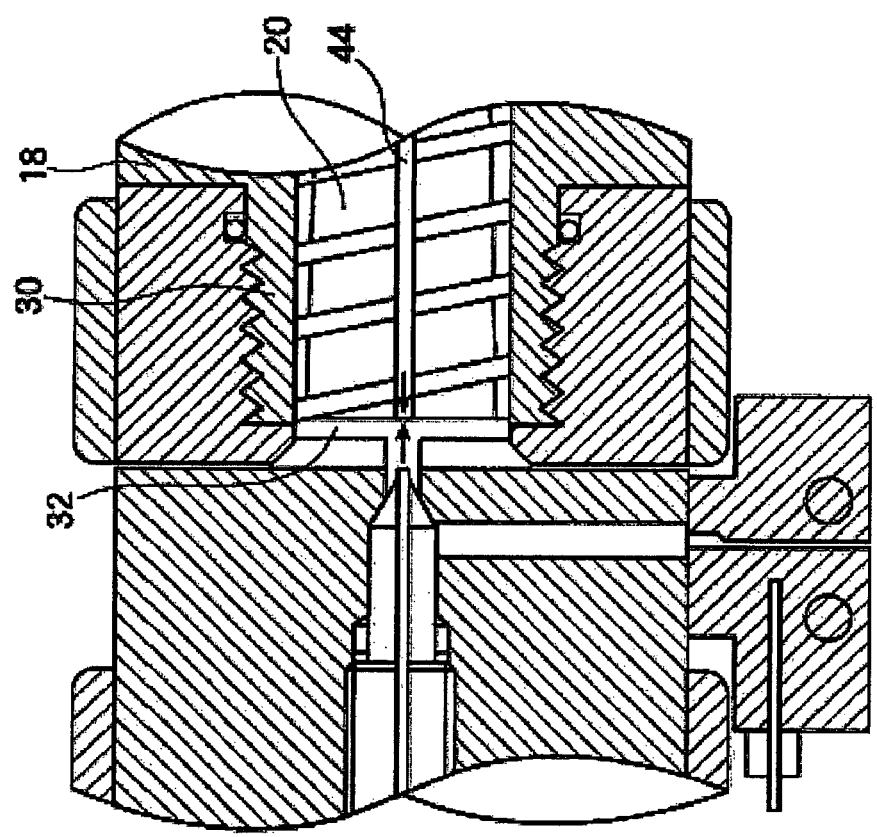

FILLER-DISPERSED MELT-KNEADED PRODUCTS, MOLDED RESIN PRODUCTS THEREOF, AND PRODUCTION METHOD THEREOF

BACKGROUND OF THE INVENTION

1. Field of the Invention

The present invention relates to a melt-kneading method for resin performed in a condition where a filling material is dispersed in a resin as well as a melt-kneaded resin product obtained by such melt-kneading method for resin; a molding method connected to such melt-kneading method for resin as well as a molded product obtained by such molding method; a molded resin product constituted by such molded product; and a substance permeating membrane or separation membrane constituted by such molded resin product as well as a gradual substance release material or support material for cell culturing constituted by such molded resin product.

2. Description of the Related Art

It has been a well-known fact that in a higher-order structure produced by blending a pair of incompatible polymers, one polymer becomes a matrix while the other polymer becomes a dispersion phase to form a sea-island structure.

This sea-island structure undergoes a phase conversion under conditions where the composition of the polymers constituting the blend becomes roughly proportional to the ratio of melt viscosities of the respective polymers, and as the blend composition and viscosity ratio change from the levels under the aforementioned conditions, the relationship of sea and island reverses. The higher-order structure that appears in a state near the conditions under which a phase conversion occurs is so-called a "co-continuous structure" where two types of polymers form mutually continuous phases. Accordingly, in any blend comprising incompatible polymers, a co-continuous structure always appears according to the aforementioned blend composition and ratio of viscosities of constituent polymers (S. Steinmann, W. Gronski, C. Friedrich, Polymer, 2002, 43, 4467 (Non-patent Literature 1); F. Gubbels, S. Blacher, E. Vanlathem, R. Jerome, R. Deltour, F. Brouers, Ph. Teyssie, Macromolecules, 1995, 28, 1559 (Non-patent Literature 2)).

Unlike the sea-island structure, this co-continuous structure forms mutually continuous phases and is known to express various physical properties that reflect such structure, with a wide range of ideas proposed for applying these physical properties. For example, use of a conductive polymer for one continuous phase allows for development of a material that takes advantage of the beneficial features of electrical conductivity or anti-electricity (Patent Literature 1). By removing one phase from the co-continuous structure using a solvent, etc., a mesoporous material comprising the other phase can be formed with ease, and methods to apply such mesoporous material as a separation membrane or filter according to the size of the material are proposed (Patent Literature 2, Patent Literature 3, Patent Literature 4). Technologies are also available to use a supercritical fluid process or other means to foam one phase in a material comprising an incompatible polymer blend. However, these technologies based on foaming only form pores of approx. several tens of micrometers in size near the surface of a bulk material, and such bulk material cannot be used to selectively cause a given substance to permeate through.

As for utilization of this co-continuous structure, traditionally a melt-kneaded product is obtained using an extruding machine, etc., and then the obtained product is molded into various shapes and used, as mentioned above. In addition to the above, there are also applications whereby a co-continuous structure is manufactured from an incompatible polymer blend, after which one of the incompatible polymers is removed using a solvent to obtain a porous material and this porous material is utilized.

For example, Japanese Patent Laid-open No. 2006-136673 (Patent Literature 6) achieves a block-type support material for use in cell engineering comprising a bio-absorbent polymer material that has a three-dimensional netlike structure having small pores of 5 to 50 µm in size and where irregular continuous pores account for 20 to 80% of the cross-section area of the structure; wherein such bio-absorbent polymer material is selected from polyglycolic acid, polylactic acid and lactic acid-glycolic acid copolymer, among others. The shape of such material is characterized by a particle size of 300 to 700 µm and average pore size of 5 µm, and specifically a small-pore structure having irregular continuous pores of 5 to 50 µm in size is described (Example 1). Similarly in Japanese Patent Laid-open No. 2006-306983 (Patent Literature 7), a porous material having continuous pores of 1 to 30 µm in average pore size is described. From the above, it is shown that the shapes of porous materials, especially shapes of formed porous materials, have high degrees of non-uniformity and that a co-continuous structure comprising an incompatible polymer blend and forming any such shaped porous material is a random structure having little regularity.

Because of the above, the co-continuous structure comprising an incompatible polymer blend as mentioned above is thermally unstable and when such co-continuous structure is thermally processed or annealed at high temperature, for example, a structural relaxation occurs to inevitably enlarge the continuous phase size in the original structure that has been formed. In other words, a polymer blend obtained this way presents a technical problem of poor thermal stability, which makes it essential to find a way to obtain a molded resin product having a stable co-continuous structure. Also, a co-continuous structure is not only thermally unstable, but it is also characterized in that the continuous phase size is determined uniquely by the composition of the blend and ratio of viscosities of constituent polymers. Because of this, controlling the continuous phase size in a desired manner using external parameters is considered difficult.

A co-continuous structure formed by an incompatible polymer blend is determined by the composition, and ratio of melt viscosities of, the polymers constituting the aforementioned blend, and naturally there is a need to develop a method to control the size of such co-continuous structure in a desired manner using some sort of external parameters.

A mesoporous structure obtained by way of a co-continuous structure has two key characteristics. One is that because the porous structure is formed three-dimensionally, such structure is most ideal for selective permeation of substances. The other is that because the remaining polymer constituting the frame of the mesoporous material, which is not removed using a solvent, also has a three-dimensionally connected structure and therefore even after the other polymer has been removed, the structure remains very strong three-dimensionally just like a natural bone structure.

For these reasons, a co-continuous structure formed by an incompatible polymer blend in a manner allowing the size of the co-continuous structure to be controlled in a desired manner using some sort of external parameters, provides an ideal structure that is thermally stable and whose continuous phase size can be determined uniquely. Also, a shaped porous material formed by way of such structure can provide a mesoporous structure having a uniform shape corresponding to the co-continuous structure.

An overview of prior arts is provided to examine the problems inherent in these conventional technologies. As mentioned above, this co-continuous structure formed by an incompatible polymer blend is thermally unstable and if such co-continuous structure is thermally processed or annealed at high temperature, for example, a structural relaxation occurs to inevitably enlarge the continuous phase size in the original structure that has been formed.

Traditionally, a product comprising an incompatible polymer blend has been processed using a kneading-type extruding machine or molding machine. However, the screw rotation speeds of these machines are around 300 rpm at most, and the shear rates achievable at such screw rotation speeds are only around 100 $sec^{-1}$. At shear rates of this level, the polymer viscosities or filling material dispersion condition cannot be changed sufficiently during kneading, which makes is impossible to mix the incompatible polymer blend at nano-level or nano-disperse a filling material such as a filler in the resin.

The inventors had already found that with a co-continuous structure obtained by an extruding machine, etc., clay would provide the effect of preventing coalescence of phases (Y. J. Li, H. Shimizu, Polymer, 2004, 45, 7381 (Non-patent Literature 3); Y. J. Li, H. Shimizu, Macromol. Rapid Commun., 2005, 26, 710 (Non-patent Literature 4)).

On the other hand, there have been successful attempts to control the size of a co-continuous structure comprising an incompatible polymer blend by operating an extruding machine under various shear force conditions (P. Potschke, D. R. Paul, Macromol. Symp., 2003, 198, 69 (Non-patent Literature 5); M. Jaziri, T. K. Kallel, S. Mbarek, B. Elleuch, Polym. Int., 2005, 54, 1384 (Non-patent Literature 6)). However, these attempts used narrow ranges of shear forces available on conventional extruding machines, and descriptions regarding the control of the size of a co-continuous structure comprising an incompatible polymer blend are limited. To be specific, screw rotation speeds are around 300 rpm at most, and the shear rates achievable at such screw rotation speeds are only around 100 $sec^-$, as mentioned above. At shear rates of this level, a filling material such as a filler cannot be dispersed sufficiently to the required uniformity at nanometer-level, if the related incompatible polymer matrix is subject to different viscosities. As a result, the above methods do not provide a fundamental solution.

The inventors therefore invented a micro-volume high-shear processing machine equipped with an internal-feedback screw, capable of rotating the screw at a speed of 1000 rpm or more and having a maximum output of 3000 rpm (Japanese Patent Laid-open No. 2005-313608 (Patent Literature 5)).

Using this apparatus, the inventors successfully invented a ferroelectric film being an extruded film product comprising 95 to 20 percent by weight of polyvinylidene fluoride (PVDF) and 5 to 80 percent by weight of polyamide 11 (PA11), wherein such film is produced by rolling an extruded film product of a nano-dispersed polymer blend in which a dispersion phase of polyamide 11 of a size of around 10 nm is dispersed uniformly in a polyvinylidene fluoride matrix phase, and then the rolled film is processed by impressing an alternating electric field (Japanese Patent Laid-open No. 2006-21195 (Patent Literature 8); H. Shimizu, Y. L. Li, A. Kaito, H. Sato, Macromolecules, 2005, 38, 7880 (Non-patent Literature 7); H. Shimizu, Y. L. Li, A. Kaito, H. Sano, J. Nanosci. Nanotechnol., 2006, 6, 12 (Non-patent Literature 8); Y. J. Li, H. Shimizu, T. Furumichi, Y. Takahashi, T. Furukawa, J. Polym. Sci.: Part B: Polym. Phys., 2007, 45, 2707 (Non-patent Literature 9)).

[Patent Literature 1] Japanese Patent Laid-open No. Hei 07-102175 (Japanese Patent No. 3142424)

[Patent Literature 2] U.S. Pat. No. 5,135,627

[Patent Literature 3] Japanese Patent Laid-open No. 2000-1612

[Patent Literature 4] German Patent Laid-open No. 4236935

[Patent Literature 5] Japanese Patent Laid-open No. 2005-313608

[Patent Literature 6] Japanese Patent Laid-open No. 2006-136673

[Patent Literature 7] Japanese Patent Laid-open No. 2006-306983

[Patent Literature 6] Japanese Patent Laid-open No. 2006-21195

[Non-patent Literature 1] S. Steinmann, W. Gronski, C. Friedrich, Polymer, 2002, 43, 4467

[Non-patent Literature 2] F. Gubbels, S. Blacher, E. Vanlathem, R. Jerome, R. Deltour, F. Brouers, Ph. Teyssie, Macromolecules, 1995, 28, 1559

[Non-patent Literature 3] Y. J. Li, H. Shimizu, Polymer, 2004, 45, 7381

[Non-patent Literature 4] Y. J. Li, H. Shimizu, Macromol. Rapid Commun., 2005, 26, 710

[Non-patent Literature 5] P. Potschke, D. R. Paul, Macromol. Symp., 2003, 198, 69

[Non-patent Literature 6] M. Jaziri, T. K. Kallel, S. Mbarek, B. Elleuch, Polym. Int., 2005, 54, 1384

[Non-patent Literature 7] H. Shimizu, Y. L. Li, A. Kaito, H. Sano, Macromolecules, 2005, 38, 7880

[Non-patent Literature 8] H. Shimizu, Y. L. Li, A. Kaito, H. Sano, J. Nanosci. Nanotechnol., 2006, 6, 3923-3928

[Non-patent Literature 9] Y. J. Li, H. Shimizu, T. Furumichi, Y. Takahashi, T. Furukawa, J. Polym. Sci.: Part B: Polym. Phys., 2007, 45, 2707

SUMMARY OF THE INVENTION

One of the problems to be solved by an embodiment of the present invention is to provide a new method for manufacturing a co-continuous structure formed by an incompatible polymer blend in a manner allowing the size of the co-continuous structure to be controlled in a desired manner using some sort of external parameters, wherein such manufacturing method achieves thermal stability as well as high controllability of the continuous phase size in a desired manner. In an embodiment, the present invention provides a new melt-kneaded material comprising a filling material as a filler and an incompatible resin or elastomer, a new molding method to form such melt-kneaded material, and a new molded material obtained by such molding method. In an embodiment, the present invention provides a new porous material having a mesoporous structure of a uniform porous size, as well as a new manufacturing method for such porous material.

To solve the aforementioned problems, the inventors expanded their research in the following manner.

1) The inventors found that when a micro-volume high-shear molding processing machine equipped with an internal-feedback screw, capable of rotating the screw at a speed of 1000 rpm or more and having a maximum output of 3000 rpm (Japanese Patent Laid-open No. 2005-313608 (Patent Literature 5): Not a regular two-axis screw kneading machine, but a micro-volume high-shear molding machine equipped with an internal-feedback screw) is used to obtain a melt-kneaded product comprising an incompatible polymer blend having a co-continuous structural composition containing a filling material as a filler, or a molded resin product comprising an incompatible polymer blend having a co-continuous structural composition, the external parameters needed to obtain the aforementioned products are the shear rate, screw rotation speed, and ratio of the added filling material with respect to the incompatible polymer blend. The samples produced at 300 rpm are defined as low-shear samples in this Specification. When the samples produced at this low shear rate were examined, they had the tendency to quickly shrink in size regardless of the added amount of clay, thereby making it impossible to control the size.

On the other hand, under high shear conditions (especially at 2000 rpm or higher speeds) the remaining phase containing pores (in a specific example, a PBS phase (poly(butylene succinate) phase) remaining after a PLLA phase (poly(l-lactide) phase) has been removed) allows for control of the dispersion condition (especially the distribution at the interface) of the filling material (clay in a specific example) using the added amount of filler and shear conditions (in a specific example, clay was omnipresent in the PBS phase), and as a result these conditions can be used as parameters to control the "pore" size in a desired manner. The inventor found that under favorable conditions, the internal structure of a melt-kneaded product, or specifically a co-continuous structure comprising an incompatible polymer blend, could be controlled in a desired manner at mesoscopic level (0.3 to 100 μm), and finally completed the present invention.

The specific embodiments are specified below.

2) A melt-kneading method for filling material and incompatible resin or elastomer, comprising: introducing a filling material as a filler and an incompatible resin or elastomer into a material feed part provided at an end of a cylindrical melt-kneading part having a heater and provided with a screw; feeding from a rear end to a front end of the screw the resin or elastomer that has been melt-kneaded under the conditions of 600 to 3000 rpm in the rotation speed of the screw and 900 to 4500 $sec^{-1}$ in shear rate, to trap the resin or elastomer in a space at the front screw end; and moving the resin or elastomer from the space to the rear screw end for circulation.

3) A melt-kneading method for filling material and incompatible resin or elastomer, comprising: introducing a filling material as a filler and an incompatible resin or elastomer into a material feed part provided at an end of a cylindrical melt-kneading part having a heater and provided with a screw; feeding from a rear end to a front end of the screw the incompatible resin or elastomer and the filling material as a filler that have been melt-kneaded under the conditions of 600 to 3000 rpm in the rotation speed of the screw, 900 to 4500 $sec^{-1}$ in shear rate, and a heating temperature roughly corresponding to the glass transition temperature or above in the case of an elastomer or amorphous polymer, or roughly near the melting point in the case of a crystal polymer, to trap the resin or elastomer and the filling material as a filler in a space that is provided between the front screw end and a sealed part positioned facing the front end and that is adjustable to a range of 0.5 to 5 mm; and moving the resin or elastomer and the filling material as a filler to the rear screw end through a hole with an inner diameter of 1 to 5 mm provided at a center of the screw.

4) A melt-kneading method for filling material and incompatible resin or elastomer according to (2) or (3) above, wherein the filling material is added by 0.001 to 30 percent by weight relative to 100 percent by weight of the incompatible resin or elastomer.

5) By using an organic solvent, etc., to process a molded resin product obtained from the melt-kneaded product obtained above, one of the polymer phases is removed and therefore a mesoporous structure comprising only the other phase is formed, and consequently a substance permeation membrane or separation membrane material corresponding to the porous size of the mesoporous structure is provided. Alternatively, the porous parts of the structure can be filled with a substance beforehand to obtain a gradual substance release material that releases the substance gradually in proportion to the biodegradation speed of the resin phase.

In an embodiment of the present invention, a melt-kneaded product comprising a filling material and an incompatible resin or elastomer, where the continuous phase size in the co-continuous structure can be controlled in a desired manner at mesoscopic level (0.3 to 100 μm), can be obtained.

In an embodiment, one of the polymer phases is removed using an organic solvent, etc., to process a molded resin product obtained from the melt-kneaded product, in order to obtain a mesoporous structure comprising only the other phase. In an embodiment, the mesoporous structure can be utilized as a substance permeation membrane, separation membrane material, gradual substance release material or support material for cell culturing corresponding to the porous size of the mesoporous structure.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

FIG. 3 is a figure explaining a space provided at a front end of a feedback screw in a melt-kneading part that can be used in an embodiment of the present invention.

DESCRIPTION OF SYMBOLS

Figure 1:
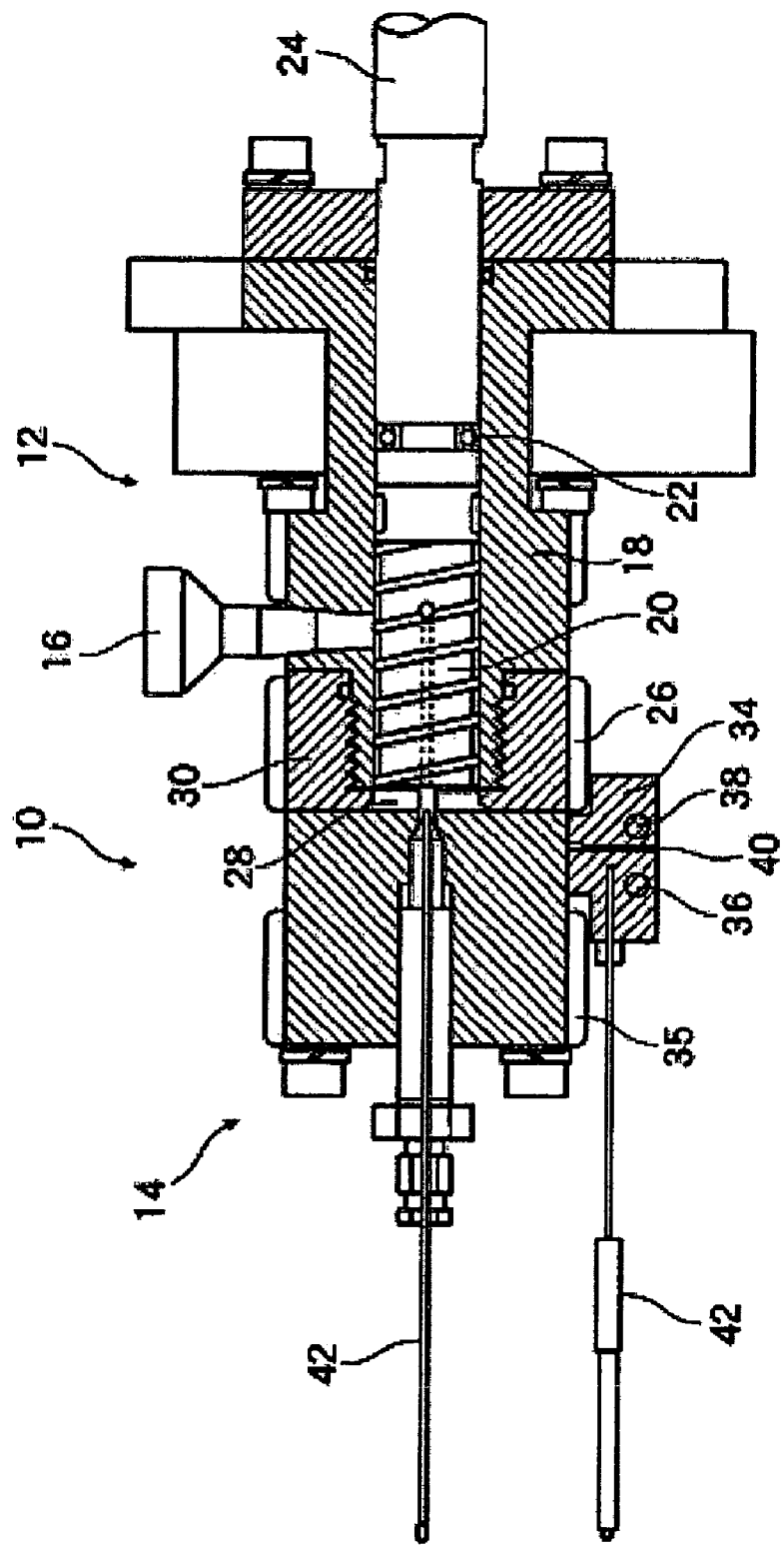
FIG. 1 is a general view of an apparatus that can be used in an embodiment of the present invention to manufacture a melt-kneaded product or molded product in which a filling material constituted by a nanometer-level filler is uniformly dispersed in an elastomer or resin.

10: Melt-kneaded product manufacturing apparatus
12: Melt-kneading part
14. Molding part
16: Material feed part
18: Cylinder
20: Feedback screw
22: Bearing
24: Shaft
26: Heater
28: Sealed part
29: Front screw end
30: Adjustment means for adjusting space
32: Space
35: Extrusion heater
36: T-die front end heater
38: T-die rear end heater
40: Discharge port
42: Thermocouple
44: Hole
46: Space between cylinder and screw
48: Screw rear
50: Screw front

DETAILED DESCRIPTION OF THE PREFERRED EMBODIMENT

A melt-kneading method conforming to the present invention, and a melt-kneaded product obtained by such melt-kneading method also conforming to the present invention, are explained in details below using best embodiments and drawings. It should be noted, however, that the present invention is not at all limited to these embodiments and drawings.

FIG. 1 is a general view of an apparatus that can be utilized in an embodiment of the present invention to manufacture a melt-kneaded product or molded product in which a filling material constituted by a nanometer-level filler is uniformly dispersed in a rubber, elastomer, thermoplastic resin or thermosetting resin.

Figure 2:
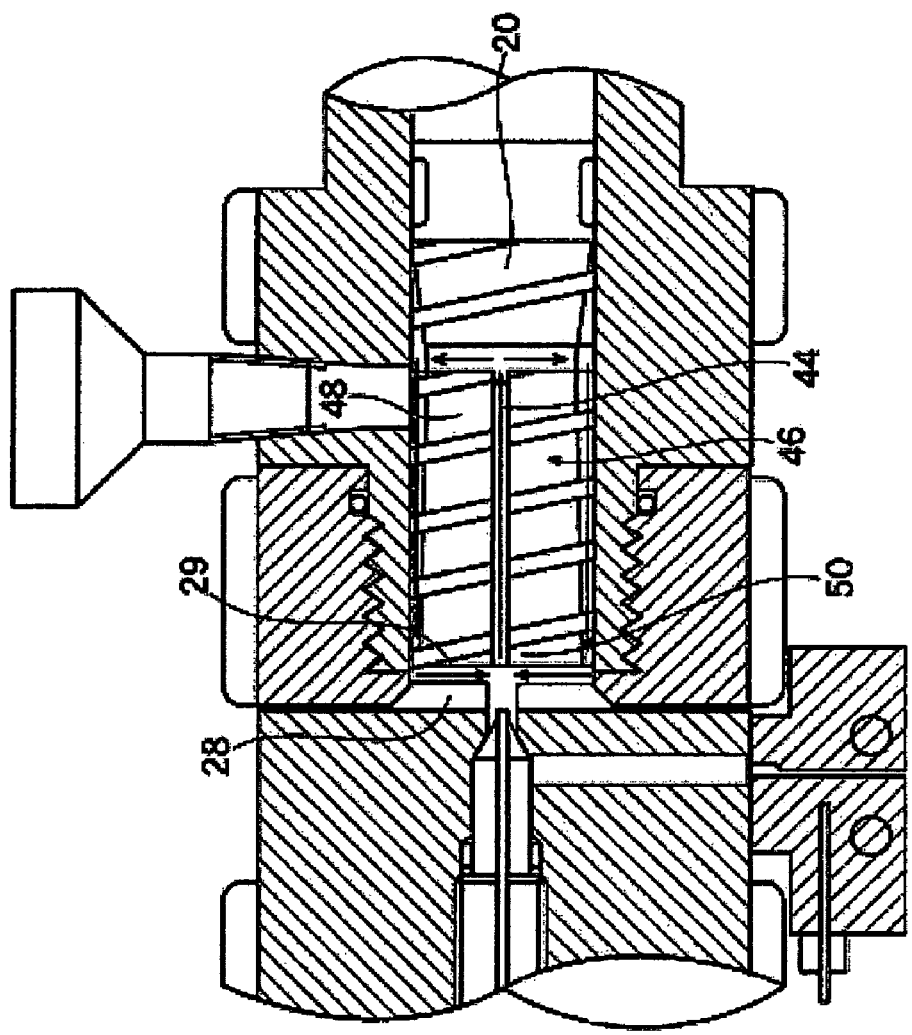
FIG. 2 is a detailed view explaining a feedback screw in a melt-kneading part that can be used in an embodiment of the present invention, as well as re-circulation of a melt-kneaded product.
Figure 4E:
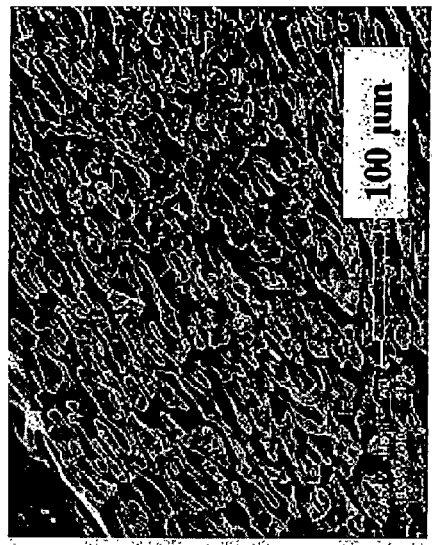
FIG. 4 provides representative SEM photographs showing co-continuous structures of samples in which clay is added by 0.1 to 15 percent by weight to each PLLA/PBS blend based on a ratio of 60/40 to 40/60.
Figure 4F:
Figure 4C:
Figure 4D:
Figure 4A:
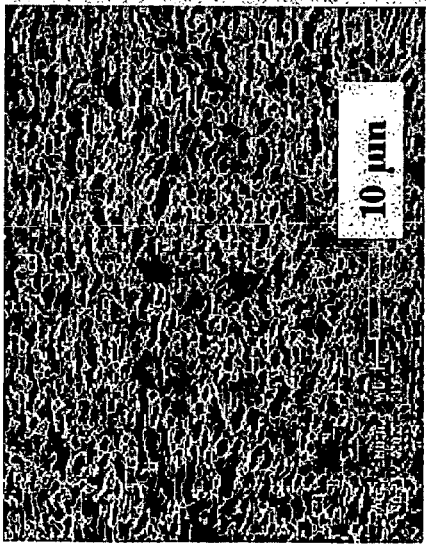
Figure 4B:
Figure 5A:
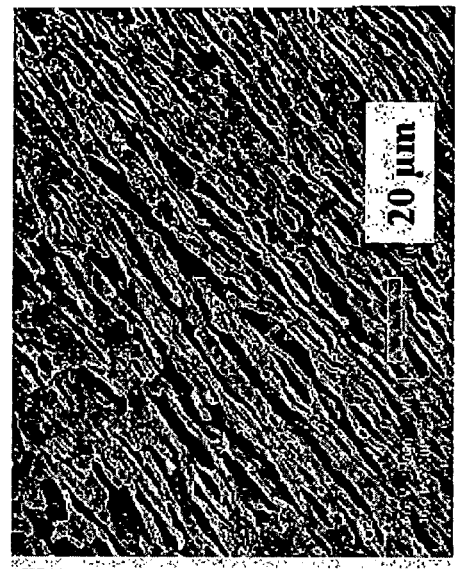
FIG. 5 provides representative SEM photographs showing co-continuous structures corresponding to PLLA/PBS/clay ratios of 55/45/8.
Figure 5C:
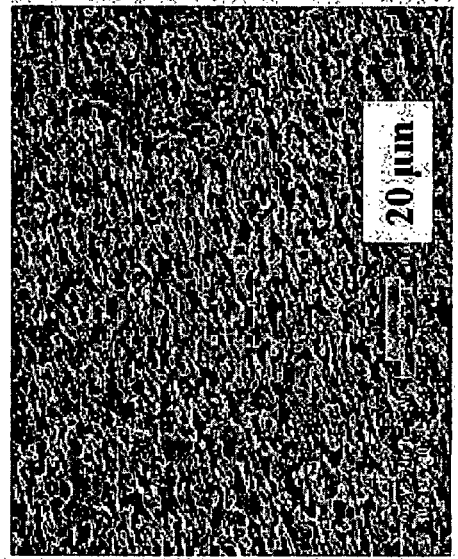
Figure 5E:
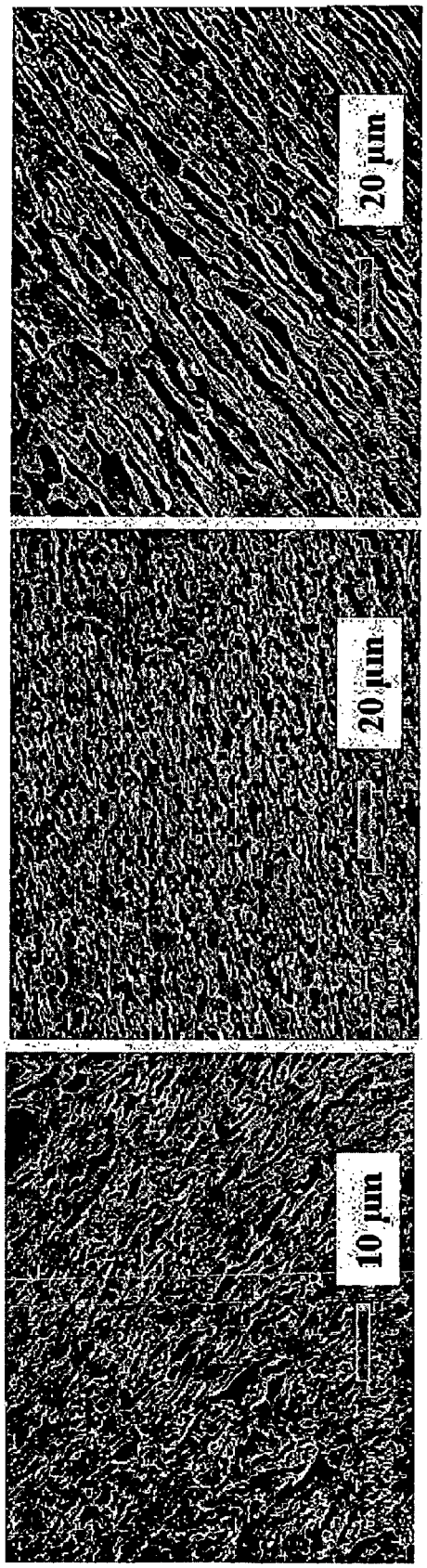
Figure 5B:
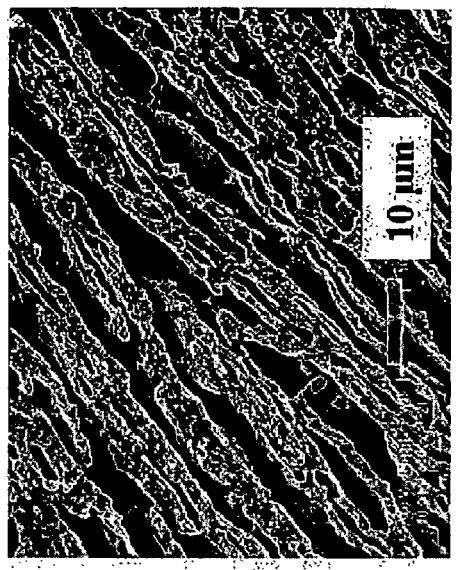
Figure 5D:
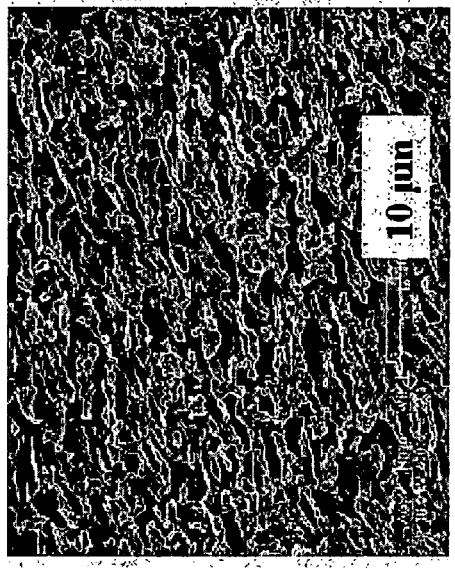
Figure 5F:
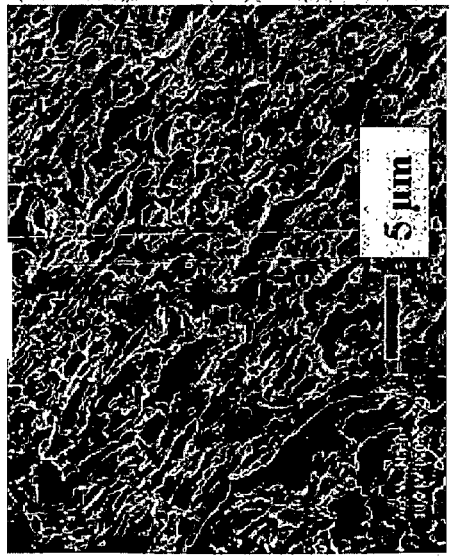

FIG. 2 is a figure explaining a feedback screw in a melt-kneading part of the apparatus shown in FIG. 1.

FIG. 3 is a figure explaining a space provided at a front end of the feedback screw in the melt-kneading part of the apparatus shown in FIGS. 1 and 2.

A melt-kneaded product manufacturing apparatus 10 comprises a material feed part 16 from which to feed materials including a filling material constituted by a filler and an incompatible resin or elastomer, a melt-kneading part 12, and a molding part 14.

The melt-kneading part 12 has a feedback screw 20 (it may also be referred to simply as "screw 20" hereinafter) in a cylinder 18. The screw 20 is installed via a shaft 24 in the cylinder 18 (FIG. 1). The filling material and incompatible resin or elastomer travel through a space 46 between the cylinder and screw (FIG. 2), where the incompatible resin or elastomer is melted and kneaded together with the filling material. The shaft 24 is connected to the screw 20 via a bearing 22. The cylinder 18 also has a heater 26 along the outer side of the cylinder to melt the incompatible resin or elastomer (FIG. 1). At the end of the cylinder 18 opposite to where the shaft 24 is positioned, a sealed part 28 is provided to seal between the melt-kneading part 12 and molding part 14.

In addition, the cylinder 18 has a space 32 provided between a front screw end 29 and the sealed part 28. The space 32 can be adjusted to a range of 0.5 to 5 mm using an adjustment means 30 for adjusting the space (FIGS. 2, 3).

The screw 20 has a sufficient structure to melt the incompatible resin or elastomer in the cylinder 18. FIG. 2 shows the space 46 between the cylinder and screw. The incompatible resin or elastomer supplied from the material feed part 16 moves, together with the filling material, through the space 46 between the cylinder and screw in the direction from a screw rear 48 to a screw front 50. The molten incompatible resin or elastomer is trapped, together with the filling material, in the space 32 formed between the front screw end 29 and sealed part 28. The molten incompatible resin or elastomer travels, together with the filling material, through a lateral hole 44 provided at a center of the screw, another hole facing a different direction, and the screw rear 48, to head toward the screw front 50 again, and in this manner melt-kneading is continued.

The melt-kneaded incompatible resin or elastomer is taken out, together with the filling material, into the molding part 14 from the space 32 via a valve (not illustrated), to be molded.

The molding part 14 has an extrusion heater 35 and a T-die 34 to manufacture film. The T-die 34 has a T-die front end heater 36 and a T-die rear end heater 38. The extruded molded product passes through a discharge port 40 formed between the T-die front end heater 36 and T-die rear end heater 38. A thermocouple 42 is inserted in the molding part and T-die front end heater 38 to measure temperature. The measured temperature is sent to a control unit (not illustrated) to be used in the temperature control of the melt-kneading part 12 and T-die. A molded product can be obtained in the form of a rod, film, sheet or fiber.

The required shear-melting time can be changed according to the time needed for the materials to pass through the space 46 between the cylinder and screw. The degree to which the incompatible resin or elastomer is sheared can be changed by changing the space formed between the screw rear end and the surface of the seal connecting diametrically to the screw rear end and screw interior. The degree to which the incompatible resin or elastomer is sheared can be raised by narrowing the space and reducing the diameter of the hole. The space, and the inner diameter of the screw hole, need to be optimal from the viewpoint of the viscosity of the incompatible resin or elastomer. The time needed to melt-knead the incompatible resin or elastomer in the cylinder is anywhere from 1 to 8 minutes.

In an embodiment of the present invention, the melt-kneading method can be implemented using the aforementioned apparatus under the following conditions, for example:

1) Implement a circulation process comprising: introducing a filling material as a filler and an incompatible resin or elastomer into the material feed part 16 provided at an end of the melt-kneading part having the heater 26 at the cylinder 18 with the screw 20; feeding from the rear end to front end of the screw the resin or elastomer that has been melt-kneaded under the conditions of 600 to 3000 rpm in the rotation speed of the screw and 900 to 4500 $sec^{-1}$ in shear rate, to trap the resin or elastomer in the space 32 at the front screw end 29; and moving the resin or elastomer from the space to the rear screw end.

2) Implement a circulation process comprising: introducing a filling material as a filler and an incompatible resin or elastomer into the material feed part 16 provided at an end of the melt-kneading part having the heater 26 at the cylinder 18 with the screw 20; feeding from the rear end to front end of the screw the incompatible resin or elastomer and the filling material as a filler that have been melt-kneaded under the conditions of 600 to 3000 rpm in the rotation speed of the screw, 900 to 4500 sec$^{-1}$ in shear rate, and a heating temperature roughly corresponding to the glass transition temperature or above in the case of an elastomer or amorphous polymer, or roughly near the melting point in the case of a crystal polymer, to trap the resin or elastomer and the filling material as a filler in a space that is provided between the front screw end 29 and sealed part 28 positioned opposite the front end; and moving the resin or elastomer and the filling material as a filler to the rear screw end through a hole with an inner diameter of 1 to 5 mm provided at a center of the screw.

As for the melt-kneading machine used in the above methods, the micro-volume high-shear processing machine equipped with an internal-feedback screw, capable of rotating the screw at a speed of 1000 rpm or more and having a maximum output of 3000 rpm (Japanese Patent Laid-open No. 2005-313608 (Patent Literature 3): Not a regular two-axis screw kneading machine, but a micro-volume high-shear processing machine equipped with an internal-feedback screw), which was invented earlier by the inventors, can be used in a favorable manner. However, any other apparatus having an equivalent function can be used in a similar manner.

In the case of (1) above, the screw rotation speed is preferably in a range of 600 to 3000 rpm, while the shear rate is preferably in a range of 900 to 4500 sec$^{-1}$.

In the case of (2) above, the space 32 provided between the front screw end and sealed part 28 positioned opposite the front end is adjustable to a range of 0.5 to 5 mm, inner diameter of the screw hole is in a range of 1 to 5 mm, rotation speed of the screw is in a range of 600 to 3000 rpm, and shear rate is in a range of 900 to 4500 sec$^{-1}$.

If the aforementioned micro-volume high-shear processing machine equipped with an internal-feedback screw is used, the intensity of the shear flow field or degree of kneading can be changed by adjusting the space between the front cylinder end and sealed part where the blend is charged or the inner diameter of the internal-feedback screw. Normally, this gap can be set to a desired value between 1 and 5 mm in a 0.5-mm increment, and similarly the inner diameter of the internal-feedback screw can be set to a desired value between 1 and 5Ø in a 0.5Ø increment. However, an optimal result can be obtained by setting the gap to a range of 1 to 2 mm, and the inner diameter of the internal-feedback screw to 2.5Ø.

The present invention is characterized in that high-shear processing is performed at the aforementioned specific temperature by setting to optimal values the gap between the frontmost end (sealed surface) and front screw end as well as the inner diameter of the internal-feedback screw. Only when the specific conditions are combined this way will a favorable result be obtained. If any one of the setting conditions, such as the temperature setting or gap setting, deviates from the aforementioned condition, a satisfactory result cannot be obtained.

If the aforementioned micro-volume high-shear processing machine equipped with an internal-feedback screw is used, the important molding conditions include not only the aforementioned specific temperature setting, but also the setting of the screw rotation speed (or shear speed) and kneading time on the applicable molding machine. In an embodiment of the present invention, a desired screw rotation speed can be set in a range of 600 to 3000 rpm, and similarly a desired kneading time can be set in a range of 0.1 to 60 minutes. However, an optimal result has been obtained by setting the screw rotation speed to a range of 600 to 2000 rpm, or more preferably to 3000 rpm, setting the shear rate to a range of 900 to 3000 sec$^{-1}$ or more preferably to 4500 sec$^{-1}$, and setting the kneading time to a range of 1 to 2 minutes.

An embodiment of the present invention is characterized in that high-shear processing is performed based on the aforementioned specific composition of the incompatible resin or elastomer and added amount of clay, and by setting the screw rotation speed and kneading time to optimal values at the specific temperature. Only when the specific conditions are combined this way will a favorable result be obtained. If any one of the setting conditions, such as the blend composition, added amount of clay, temperature setting or rotation speed setting, deviates from the aforementioned condition, a satisfactory result cannot be obtained.

Under the aforementioned melt-kneading method for filling material and incompatible resin or elastomer, the filling material is added by 0.001 to 30 percent by weight relative to 100 percent by weight of the incompatible resin or elastomer.

If the melt-kneading method is implemented by combining a biodegradable resin with an incompatible resin, (a) biodegradable fatty acid polyester comprising polylactic acid (PLLA) and polyglycolic acid (PGA), (b) combination of polylactic acid (PLLA) and polybutylene succinate (PBS), (c) copolymer produced by copolymerization of polylactic acid (PLLA) with polybutylene succinate and succinic acid (PBSA), (d) combination of polylactic acid (PLLA) and poly (ε-caprolactone) (PCL), or (e) polylactic acid (PLLA) and polybutylene adipate butylene terephthalate copolymer (PBAT) can be used by combining 70 to 30 percent by weight of polylactic acid (PLLA) with 30 to 70 percent by weight of resin PBS (or PBSA), etc., and adjusting the added amount of clay (filling material) to a range of 0.01 to 30 percent by weight relative to 100 percent by weight of the blend. However, an optimal result can be achieved by combining 60 to 40 percent by weight of polylactic acid (PLLA) and 40 to 60 percent by weight of resin PBS (or PBSA), etc., and adding 0.1 to 15 percent by weight of clay relative to 100 parts of the blend.

As for a thermoplastic resin, natural rubber, synthetic rubber and thermoplastic elastomer, if a combination of incompatible resins, or combination of a thermoplastic resin and an incompatible thermoplastic elastomer, or combination comprising an incompatible blend of natural rubbers, synthetic rubbers or thermoplastic elastomers is used, the mixing ratio is 70 to 30 percent by weight for one material, and 30 to 70 percent by weight for the other material combined with the first material, as mentioned above. The filling material is added by 0.01 to 30 percent by weight relative to 100 percent by weight of the resin or resin blend.

Another embodiment of the present invention is characterized in that high-shear processing is performed based on the aforementioned specific blend composition and added amount of clay, and by setting the screw rotation speed and kneading time to optimal values at the specific temperature. Only when the specific conditions are combined this way will a favorable result be obtained. If any one of the setting conditions, such as the blend composition, added amount of clay, temperature setting or rotation speed setting, deviates from the aforementioned condition, a satisfactory result cannot be obtained.

In an embodiment of the present invention, the applicable incompatible resin refers to (1) combination of a biodegradable resin and an incompatible resin, (2) as for a thermoplastic resin, natural rubber, synthetic rubber and thermoplastic elastomer, combination of incompatible resins, or combination of a thermoplastic resin and an incompatible thermoplastic elastomer, or (3) combination comprising an incompatible blend of natural rubbers, synthetic rubbers or thermoplastic elastomers.

Examples of the combination of a biodegradable resin and an incompatible resin in (1) are specified below:

a) Biodegradable fatty acid polyester comprising polylactic acid (PLLA) and polyglycolic acid (PGA)

b) Combination of polylactic acid (PLLA) and polybutylene succinate (PBS)

c) Copolymer produced by copolymerization of polylactic acid (PLLA) with polybutylene succinate and succinic acid (PBSA)

d) Combination of polylactic acid (PLLA) and poly(ε-caprolactone) (PCL)

e) Polylactic acid (PLLA) and polybutylene adipate butylene terephthalate copolymer (PBAT)

As for the biodegradable fatty acid polyester comprising polylactic acid (PLLA) and polyglycolic acid (PGA) in (a) above, 70 to 30 percent by weight of polylactic acid (PLLA) is combined with 30 to 70 percent by weight of polyglycolic acid.

As for the combination of polylactic acid (PLLA) and polybutylene succinate (PBS) in (b) above, 70 to 30 percent by weight of polylactic acid (PLLA) is combined with 30 to 70 percent by weight of polybutylene succinate (PBS).

As for the copolymer produced by copolymerization of polylactic acid (PLLA) with polybutylene succinate and succinic acid (PBSA) in (c) above, 70 to 30 percent by weight of polylactic acid (PLLA) is combined with 30 to 70 percent by weight of polybutylene succinate (PBSA).

As for the combination of polylactic acid (PLLA) and poly(ε-caprolactone) (PCL) in (d) above, 70 to 30 percent by weight of polylactic acid (PLLA) is combined with 30 to 70 percent by weight of poly(ε-caprolactone)(PCL).

As for the combination of polylactic acid (PLLA) and polybutylene adipate butylene terephthalate copolymer (PBAT) in (e) above, 70 to 30 percent by weight of polylactic acid (PLLA) is combined with 30 to 70 percent by weight of polybutylene adipate butylene terephthalate copolymer (PBAT).

A more optimal result can be obtained by adjusting the range of each of the above combinations to 60 to 40 percent by weight of PLLA and 40 to 60 percent by weight of PBS (or PBSA).

The molecular structure of polylactic acid (PLLA) is preferably one containing 85 to 100 percent by mol, or more preferably 85 to 98 percent by mol, of L-lactic acid unit or D-lactic acid unit, and one containing 0 to 15 percent by mol, or more preferably 2 to 15 percent by mol, of the lactic acid unit of the respective enantiomer.

As for the aforementioned substances, commercial products such as those specified below can be used. In the examples, a product whose Mw is 170000 and D-isomer content is 1.2% is used.

Examples of commercial polyglycolic acid products include a polyglycolide by Sigma-Aldrich.

Examples of commercial polybutylene succinate products include Bionolle 1001, Bionolle 1020 and Bionolle 1903 by Showa Highpolymer, among others.

Examples of commercial polybutylene succinate adipate products include Bionolle 3001 and Bionolle 3020 by Showa Highpolymer, among others.

Examples of polybutylene succinate terephthalate products include Ecoflex by BASF and Biomax by DuPont, among others.

Example of the combination comprising a thermoplastic resin, natural rubber, synthetic rubber and thermoplastic elastomer in (2) are as specified below.

Examples of the combination of incompatible resins or combination of a thermoplastic resin and an incompatible thermoplastic elastomer are specified below:

a) Blend of incompatible thermoplastic resins b) Blend of a thermoplastic resin and an incompatible natural rubber or synthetic rubber c) Blend of a thermoplastic resin and an incompatible thermoplastic elastomer, or blend of a thermoplastic resin and a thermoplastic elastomer and an incompatible natural rubber and/or synthetic rubber d) Blend of a thermoplastic resin and a thermoplastic elastomer and an incompatible natural rubber and/or synthetic rubber Examples of the combination comprising an incompatible blend of natural rubbers, synthetic rubbers or thermoplastic elastomers in (3) are specified below:

a) Blend of a natural rubber and/or synthetic rubber and an incompatible thermoplastic elastomer b) Blend of incompatible thermoplastic elastomers Examples of thermoplastic resins include polyolefin resins (such as high-density polyethylene (HDPE), low-density polyethylene (LDPE), ultrahigh molecular weight polyethylene (UHMWPE), isotactic polypropylene, syndiotactic polypropylene and other polypropylenes (PPs), and ethylene propylene copolymer resins), polyamide resins (such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer), polyester resins (such as polylactic acid (PLLA), polycarbonate (PC), polybutylene terephthalate (PBT), polyethylene terephthalate (PET), polyethylene isophthalate (PEI), polyester copolymer, PET/PEI copolymer, polyalylate (PAR), polybutylene naphthalate (PBN), liquid crystal polyester, polyoxyalkylene dimidic acid/polybutylate terephthalate copolymer and other aromatic polyesters), polyether resins (such as polyacetal (POM), polyphenylene oxide (PPO), polysulfone (PSF), and polyether ether ketone (PEEK)), polynitrile resins (such as polyacrylonitrile (PAN), polymethacrylonitrile, acrylonitrile/styrene copolymer (AS), methacrylonitrile/styrene copolymer, and methacrylonitrile/styrene/butadiene copolymer), polymethacrylate resins (such as methyl polymethacrylate (PMMA) and ethyl polymethacrylate), polyvinyl resins (such as vinyl acetate (EVA), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methyl acrylate copolymer), cellulose resins (such as cellulose acetate and cellulose acetate butyrate), fluorine resins (such as polyvinylidene fluoride (PVDF), polyvinyl fluoride (PVF), polychlorofluoroethylene (PCTFE), and tetrafluoroethylene/ethylene copolymer (ETFE)), imide resins (such as aromatic polyimide (PI)), and polyacetal.

Examples of elastomers and natural rubbers include diene rubbers and hydrogenates thereof (such as NR, IR, epoxylated natural rubber, SBR, BR (high-cis BR and low-cis BR), NBR, hydrogenated NBR, and hydrogenated SBR), olefin rubbers (such as ethylene-propylene-diene rubber (EPDM), EPM and other ethylene propylene rubbers, maleic-acid denatured ethylene propylene rubber (M-EPM), IIR, copolymer of isobutylene and aromatic vinyl or diene monomer, acrylic rubber (ACM), and ionomer), halogen-containing rubbers (such as Br-IIR, CI-IIR, isobutylene paramethyl styrene copolymer bromide (Br-IPMS), CR, hydrin rubber (CHR), chlorosulfonated polyethylene (CSM), chlorinated polyethylene (CM), and maleic-acid denatured chlorinated polyethylene (M-CM)), silicon rubbers (such as methyl vinyl silicon rubber, dimethyl silicon rubber, and methyl phenyl vinyl silicon rubber), sulfur-containing rubbers (such as polysulfide rubber), fluororubbers (such as vinylidene fluoride rubber, fluorine-containing vinyl ether rubber, tetrafluoroethylene-propylene rubber, fluorine-containing silicon rubber, and fluorine-containing phosphazene rubber), urethane rubbers, epichlorohydrin rubbers, and elastomers (such as styrene elastomer, olefin elastomer, ester elastomer, urethane elastomer, and polyamide elastomer).

Examples of elastomers include non-polar elastomers having no polar group, such as poly(styrene-b-butadiene-co-butylene-b-styrene) (SBBS), poly(styrene-butadiene-styrene) (SBS) or ethylene propylene rubber. Other elastomers can also be used in a similar manner. For all of the aforementioned elastomers, known substances can be purchased and used. Since SBBS, SBS, etc., are thermoplastic elastomers, they need not be cross-linked like natural rubbers. These elastomers are substances that can be easily molded like any normal resin, while also exhibiting excellent rubber-like elasticity.

Elastomers and rubbers achieve a uniform molten state and maintain a kneaded state.

Other elastomers and rubbers can also be used in a manner similar to what is explained in the examples.

The other material is a filling material constituted by a filler.

The filling material constituted by a filler is a nanometer-size level filler and specifically selected from (1) clays that are layer silicates, (2) synthetic micas, (3) fine silica particles, and (4) fine caged silica particles.

These fillers comprise primary particles with small particle sizes and void ratios and therefore provide a very strong cohesive force between filler particles that are mutually connected to one another from the beginning. Accordingly, it has been considered difficult to undo this cohesive force using normal methods. Under the present invention, any such filler can be dispersed in an incompatible resin or elastomer in a condition where particles are unconnected.

1) Layer Silicates

Layer silicates are also called "phyllosilicates." Layer silicates are a group of silicates each having a layered structure where a tetrahedron comprising Si or Al surrounded by four oxygen atoms shares three apexes with each adjacent tetrahedron to form a two-dimensionally expanding structural unit (tetrahedral sheet). An octahedral sheet formed by two-dimensionally connected octahedrons each comprising Mg, Al, etc., surrounded by six oxygen atoms or OH molecules is also an important component. Layer silicates have a perfect cleavage parallel with the layer surface, and generally have a sheet or flake-like form. Chemically, layer silicates are hydrated silicates of Al, Mg, Fe, alkalis, etc. Examples include Cloisite 30B (Southern Clay Products) and Purifeed (trademark, Tokuyama; anhydrous crystal layer sodium silicate).

2) Synthetic Micas

Micas are sheet-like crystals belonging to the phyllosilicate mineral mica family, characterized by having a perfect cleavage in the base. Their structure comprises a laminate formed by layering a stack of layers each called a "tablet" where an octahedral layer is sandwiched by a pair of tetrahedral layers constituted by a series of six-membered rings of $SiO_4$ tetrahedrons all facing the same direction. Si in the tetrahedral layer may be partially substituted by a trivalent cation such as $Al^{3+}$, $Fe^{3+}$ or $B^{3+}$ or quadrivalent cation such as $Ge^{4+}$. The octahedral layer is pentavalent or hexavalent by containing such cations as $Li^{2+}$, $Mg^{2+}$, $Fe^{2+}$, $Al^{3+}$ and $Fe^{3+}$. The tablet is charged with negative electricity and has alkali metal cations such as K and Na between the layers. These areas become weak lines where cleavage occurs. Micas have a scale-like crystalline shape.

A colorless and transparent pure crystal free from any transition metal or heavy metal can be produced by synthesizing a mica. On the other hand, the color or function of a mica can be controlled by mixing a trace amount of metal. Also, the swelling property can be added, just like smectite, by changing the ions between mica layers from $K^+$ to $Na^+$ or $Li^+$.

Swellable micas adsorb water molecules between crystal layers upon contact with water, and thereby swell, as is the case of smectite, and consequently disintegrate and disperse in water. Na tetrasilicic mica is a representative synthetic mica. When melted and synthesized, Na tetrasilicic mica co-forms cristobalite, amphibole, etc. Fifty percent of Na ions located between layers have ion exchange property. The crystal has a size of 10 to 20 µm, which is larger than natural smectite. Accordingly, the aspect ratio in a dispersed state is as high as 500 to 1,000. Na tetrasilicic mica has a basal spacing of 9.6 Å in a dry state. When water vapor in air is adsorbed, it takes the form of a single water layer of d001=12.6 Å. When water is added further, water molecules enter between layers and the mica disperses in water. Because of its large particle size, Na tetrasilicic mica has fewer dispersed particles at a specific concentration and thus its viscosity does not increase. Accordingly, a high-concentration suspension can be prepared, which is one characteristic of Na tetrasilicic mica. Tetrasilicic mica of K or Na type can be synthesized, but it is known that a Li-type blend only produces spodumene and does not form Li tetrasilicic mica.

Na teniolite is a form of swellable mica having the highest crystallization ratio and its cation exchange capacity (CEC) corresponds to the theoretical value of approx. 250 meq/100 g. However, although Na teniolite swells by adsorbing water molecules, it does not disintegrate. Li teniolite also has a high crystallization ratio, but unlike the Na type, Li teniolite is a free-swelling form of teniolite whose particles disintegrate and disperse in water.

Swellable mica particles dispersed in water are flake-like particles of up to 10 µm in size and 2 to 10 nm in thickness.

3) Fine Silica Particles

Fine silica particles refer to synthetic silica particles. Silicon dioxide particles gather to form a series of fine pores like a net. Various substances such as water vapor can be adsorbed inside these fine pores. Silica production methods are largely classified into two types, which are: (1) precipitation of silica by means of a neutralization and decomposition reaction of an aqueous sodium silicate solution using an acid or alkali metal salt (wet method), and (2) precipitation of silica by means of a high-temperature vapor-phase reaction (dry method).

Fine silica particles are super-fine particles made by adjusting the cohesiveness of silica particles. They have a sharp particle size distribution and exhibit good dispersion property (examples include E-200A, E-220A, K-500, E-1009, E-101 1, E-1030, E-150J, E-170E, E-200 and E-220 (product names) by Tosoh).

Tokusil (trademark, Tokuyama) comprises very fine single particles (approx. 2 nm) connected in a string-like form and these strings are further entangled with one another to create a three-dimensional netlike structure. Although the true specific gravity of this wet silica is 2.0 g/cm$^3$, because of its netlike structure there are many internal voids and these voids produce a light, white powder that looks cottony on the surface. Silica sols are known for their utility as coating agents for various material substances (Japanese Patent Laid-open No. 2004-136164). By using fine silica particles with a nano-level particle size and dispersing them in a resin, it is expected that mechanical performance properties such as heat resistance can be improved while maintaining the transparency of the resin.

4) Caged Silica Compounds

Caged silica polysilsesquioxane (polyhedral oligomeric silsesquioxane: POSS) compound is a new filler having a three-dimensional caged structure and offering the advantages of both inorganic and organic compounds. Since inside the caged three-dimensional structure a non-reactive group that enhances solubility (such as a methyl group, isobutyl group, isooctyl group or other alkyl group or phenyl group) is polymerized, or a grafting functional group (such as an aminopropyl group, epoxy group, halogen group, thiol group or acrylic group) is bonded to a silicon atom, it is expected that the mechanical characteristics, heat resistance, optical characteristics, gas permeability, flame resistance, chemical resistance, etc., of existing materials can be improved dramatically by selecting an appropriate functional group or groups to constitute the caged three-dimensional structure and then micro-dispersing the resulting filler in a resin, rubber, etc.

As for this caged polysilsesquioxane (POSS), various caged polysilsesquioxane (POSS) compounds are known. An example is shown below (Japanese Patent Laid-open No. 2006-285017).

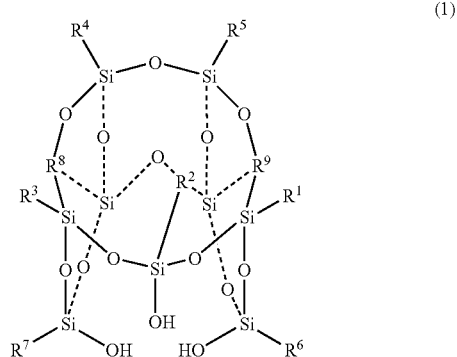

(In the formula, all of $R^1$ to $R^9$ are simultaneously, or each of $R^1$ to $R^9$ is individually, a methacryl group, epoxy group, methyl group, fluoroalkyl group or $CF_3(CF_2)_n$-$R^{10}$. Here, $R^{10}$ is a non-substituent or substituent bivalent hydrocarbon group having 1 to 12 carbon atoms, while n is an integer of 0 to 10.)

For example, a caged polysilsesquioxane can be synthesized as follows.

As for an alkoxysilane that can be used in the synthesis of a caged polysilsesquioxane expressed by general formula (1) above, examples include 3-glycidoxy propyl trimethoxysilane, 2-(3,4-epoxy cyclohexyl) ethyl trimethoxysilane, 3-methacryloxy propyl trimethoxysilane and 3,3,3-trifluoropropyl trimethoxysilane, among others.

Here, the caged polysilsesquioxane to be obtained can be changed by selecting a desired alkoxysilane as deemed appropriate. To be specific, 3-glycidoxy propyl trimethoxysilane, 2-(3,4-epoxy cyclohexyl) ethyl trimethoxysilane and 3-methacryloxy propyl trimethoxysilane can be used, among others.

Filling materials comprising these substances are generally in a range of several nanometers to several tens of nanometers in size. All of these are known substances and commercially available.

As for a melt-kneaded product obtained by the melt-kneading method explained above, under the aforementioned favorable conditions the internal structure of such melt-kneaded product, or specifically a co-continuous structure comprising an incompatible polymer blend, can be obtained as a structural composition controlled in a desired manner at mesoscopic level (0.3 to 100 μm).

The details of this co-continuous structure were observed by manufacturing a molded resin product using a melt-kneaded product and selectively removing the PLLA phase using tetrahydrofuran as a solvent, and then observing the resulting continuous (porous) phase size using a scanning electron microscope (SEM).

If a biodegradable resin is combined with an incompatible resin to implement the melt-kneading method, the following combinations can be used:

a) Combination of polylactic acid (PLLA) and polybutylene succinate (PBS)

b) Combination of polylactic acid (PLLA) and polyglycolic acid c) Copolymer produced by copolymerization of polylactic acid (PLLA) with polybutylene succinate and succinic acid (PBSA)

d) Combination of polylactic acid (PLLA) and poly(ϵ-caprolactone) (PCL)

e) Polylactic acid (PLLA) and polybutylene adipate butylene terephthalate copolymer (PBAT)

The above combinations can be used by combining 70 to 30 percent by weight of polylactic acid (PLLA) with 30 to 70 percent by weight of resin PBS (or PBSA), etc., and adjusting the added amount of clay (filling material) to a range of 0.01 to 30 percent by weight relative to 100 percent by weight of the blend. However, an optimal result can be achieved by combining 60 to 40 percent by weight of polylactic acid (PLLA) and 40 to 60 percent by weight of resin PBS (or PBSA), etc., and adding 0.1 to 15 percent by weight of clay relative to 100 parts of the blend.

If a combination of incompatible resins, combination of a thermoplastic resin and an incompatible thermoplastic elastomer, or combination comprising an incompatible blend of natural rubbers, synthetic rubbers or thermoplastic elastomers is used, the mixing ratio is 70 to 30 percent by weight for one material, and 30 to 70 percent by weight for the other material combined with the first material, in a manner similar to what is mentioned above. The filling material is added by 0.01 to 30 percent by weight relative to 100 percent by weight of the resin or resin blend.

To melt-knead the above, a dry blending method where the ingredients are mixed in a granular state can be used. Dry blending can be performed after the sample has been dried for 12 hours in a vacuum of 80° C., for example, but the specific conditions are not at all limited to the foregoing.

As for a melt-kneaded product obtained by this melt-kneading method, under the aforementioned favorable conditions the internal structure of such melt-kneaded product, or specifically a co-continuous structure comprising an incompatible polymer blend, can be obtained as a structural composition controlled in a desired manner at mesoscopic level (0.3 to 100 μm).

The details of this co-continuous structure were observed by manufacturing a molded resin product using a melt-kneaded product and selectively removing the PLLA phase using tetrahydrofuran as a solvent, and then observing the resulting continuous (porous) phase size using a scanning electron microscope (SEM).

Figure 6A:
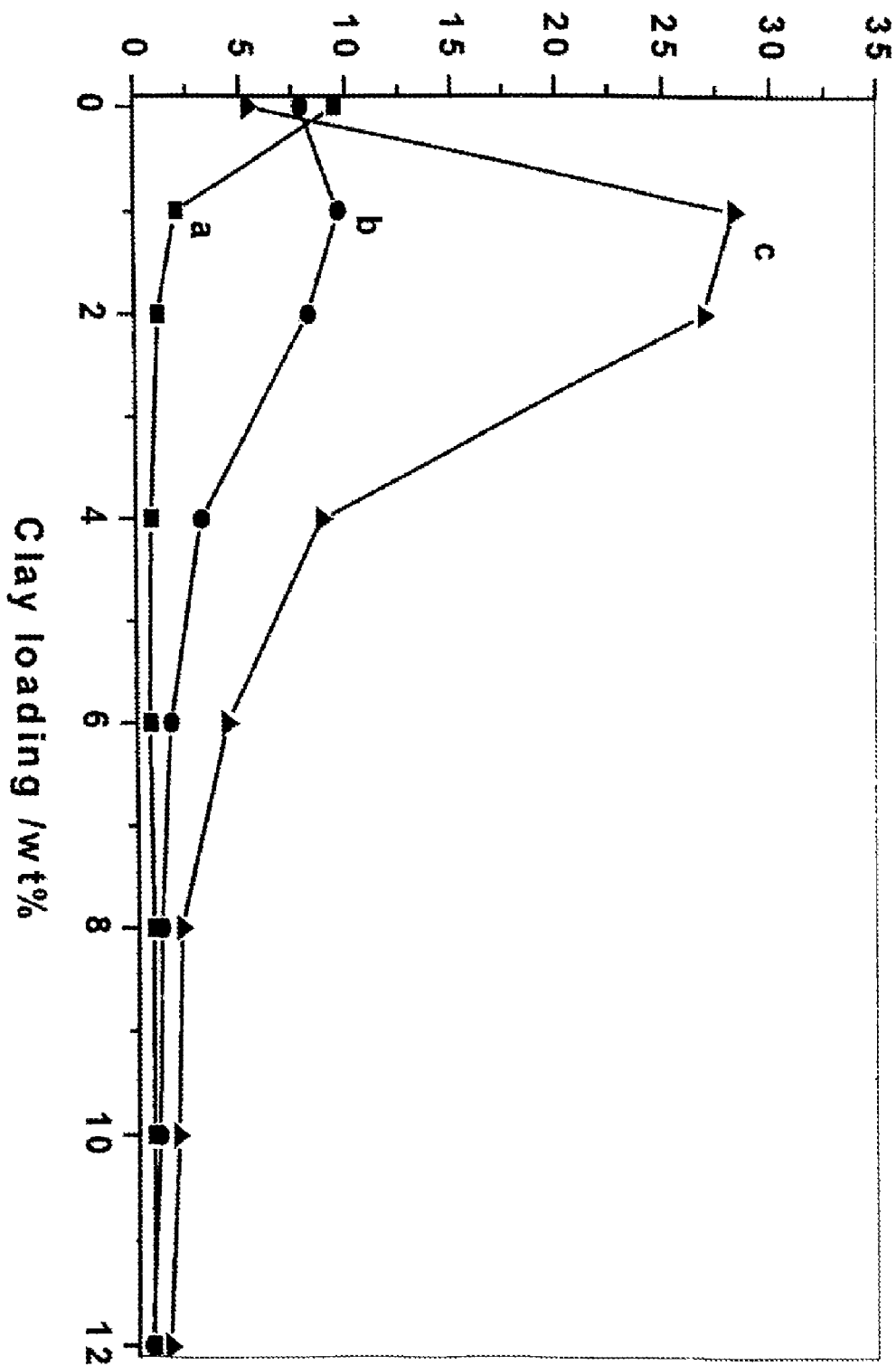
FIGS. 6A and 6B are graphs showing how the porous phase size changes in a PLLA/PBS blend based on a 55/45 ratio when the added amount of clay and shear speed are used as parameters. Lines a, b and c indicate the results at 300 rpm, 1000 rpm and 2000 rpm, respectively.
Figure 6B:
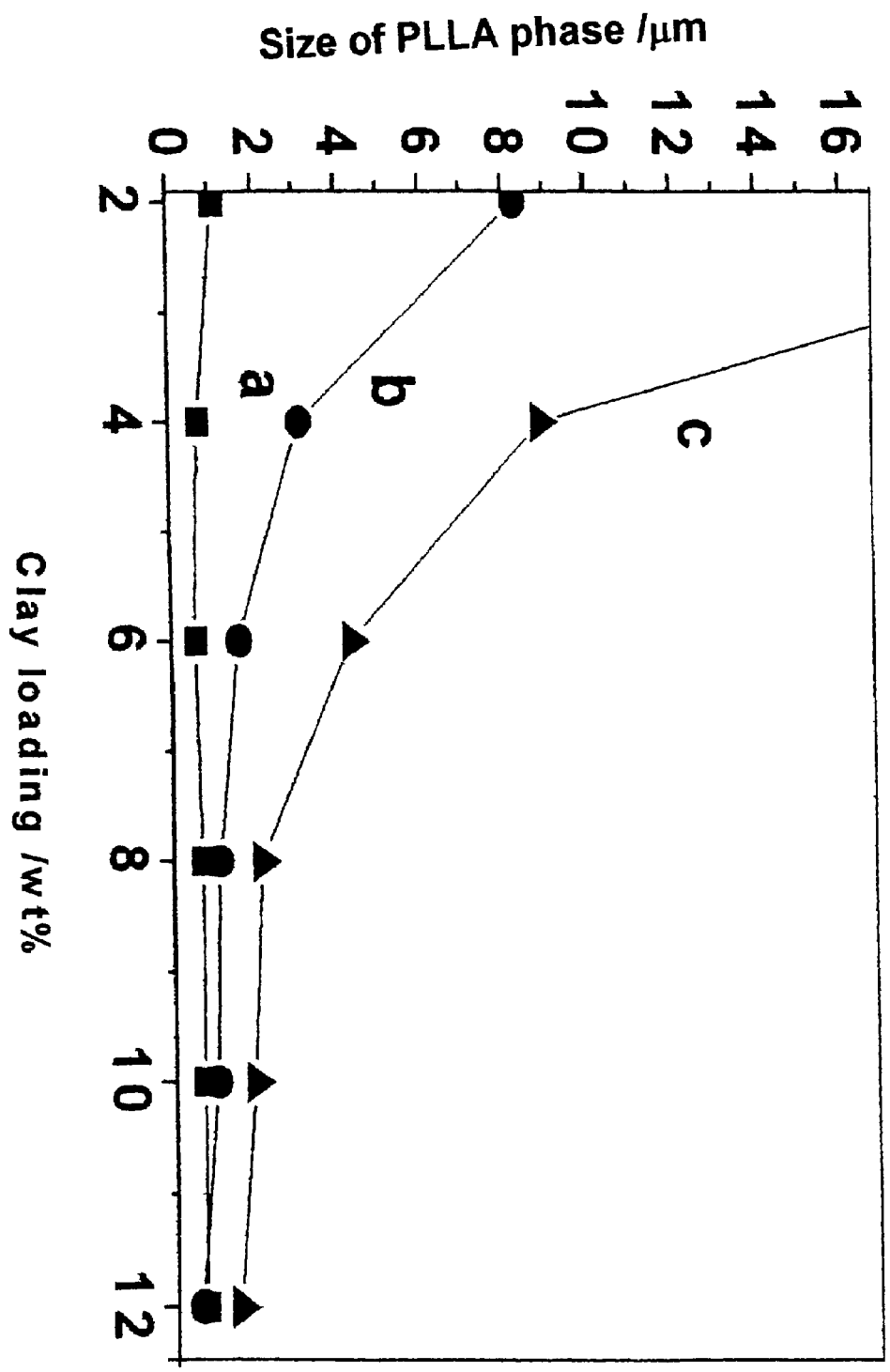

FIGS. 6A and 6B shows the results of Example 3 explained later. These results confirm the following.

In high-shear kneading (screw rotation speed: 2000 rpm), the porous phase size increased to as much as 30 to 40 µm by adding clay by only 1%. This is probably due partly to a significant change in the resin viscosity achieved by adding a small amount of clay, and partly to a change in the interfacial tension between constituent polymers also achieved by adding clay.

Actually, the porous phase size decreased rapidly as the added amount of clay was further increased.

Also as evident from the figures, the porous phase size decreased rapidly in low-shear kneading (screw rotation speed: 300 rpm) until the clay content reached 2%, but adding clay further did not affect the size.

On the other hand, the porous phase size could be controlled more effectively through addition of clay when the conditions were adjusted closer to those corresponding to high-shear kneading (screw rotation speed: 1000, 2000 rpm).

It is understood that the porous size in a PLLA/PBS/clay co-continuous structure can be controlled freely based on the added amount of clay and shear speed. By using high-shear molding and adding a desired amount of clay, the porous size can be controlled over a wide range.

By molding a melt-kneaded product, a molded resin product can be obtained.

By passing a melt-kneaded and extruded product through a T-die installed at the end of a molding machine, a film or sheet (it may also be referred to as "film product" hereinafter) can be obtained.

In addition to the above, such molded resin product can also be manufactured as a rod.

The aforementioned molded resin product has a co-continuous structure formed by continuous phases each comprising an incompatible resin or elastomer.

For example, a co-continuous structure having a micro-structure comprising continuous PLLA and PBS (or PBSA) phases is formed.

In the aforementioned molded resin product, PLLA and PBS (or PBSA) phases form a co-continuous structure as a micro-structure, and when one of the phases is removed using a solvent, etc., after this co-continuous structure has been formed, a mesoporous structure is formed.

The size of this mesoporous structure of the molded resin product can be controlled in a desired manner in a range of 0.3 to 100 µm using the added amount of clay, shear speed and screw rotation speed as parameters. The aforementioned molded resin product can have its mesoporous structure comprising a biodegradable resin.

When such molded resin product is processed using a solvent, the PLLA phase can be selectively removed and as a result, (porous) phases constituting a co-continuous structure are obtained. The obtained structure can be utilized as a substance permeation membrane, separation membrane material or biodegradable filter material according to the porous size. Also, the filling material or other material contained in the structure is released in proportion to the biodegradation speed, which makes it possible to use the obtained structure as a gradual substance release material, drug delivery material or support material for cell culturing. Under the present invention, a porous material with a size of a little over ten microns to several tens of microns can be manufactured, where such structure is suitable for cell culturing.

In the present disclosure where conditions and/or structures are not specified, the skilled artisan in the art can readily provide such conditions and/or structures, in view of the present disclosure, as a matter of routine experimentation. For example, in an embodiment, the apparatus disclosed in U.S. patent application Ser. No. 12/028,213 owned by the same assignee as in the present application can be used, and the disclosure of the U.S. Patent Application is incorporated herein by reference in its entirety. Also, in the present disclosure, the numerical numbers applied in embodiments can be modified by a range of at least ±50% in other embodiments, and the ranges applied in embodiments may include or exclude the endpoints.

Next, the present invention is explained in more details using examples.

Under this Specification, each co-continuous structure, and the (porous) size of the continuous phase obtained by removing one of the phases using a solvent, were measured as follows.

Each co-continuous structure was observed using a scanning electron microscope (SEM).

Each sample was processed as explained below. The obtained sample was observed using a SEM.

When the internal structure of each sample (kneaded resin product or molded resin product) was observed, the sample was fractured in liquid nitrogen and the fractured surface was coated with Au prior to observation by a SEM.

As for the measuring system, a Hitachi S-800 was used to perform measurement at an acceleration voltage of 10 kV. The (porous) size of the continuous phase was estimated as an average based on SEM photographs.

EXAMPLE 1

Among the materials, a commercial product (Mw=170000, D-isomer content=1.2%) was used directly for polylactic acid (PLLA), while Bionolle 1020 by Showa Highpolymer was used for polybutylene succinate (PBS).

Also, Cloisite 30B by Southern Clay Products was used for layer silicate (clay).

These materials were pre-dried for 12 hours in a vacuum of 80° C., after which they were dry-blended at the specified ratios.

In dry blending, instead that 70 to 30 percent by weight of PLLA was combined with 30 to 70 percent by weight of PBS (or PBSA), 60 to 40 percent by weight (55 percent by weight in this example) of PLLA was combined with 40 to 60 percent by weight (45 percent by weight in this example) of PBS (or PBSA), in room temperature to constitute the blend composition, and clay was added by 0.1 to 15 percent by weight (1 to 12 percent by weight in this example), instead of 0.01 to 30 percent by weight, with respect to 100 percent by weight of the blend.

Next, approx. 5 g of the obtained dry blend was introduced into a micro-volume high-shear molding machine and then kneaded/melted while heating to 190° C. by setting the gap to a range of 1 to 2 mm and the inner diameter of the internal-feedback screw to 2.5Ø (at screw rotation speeds of 300, 1000 and 2000 rpm (corresponding to shear rate of 450, 1500 and 3000 $sec^{-1}$, respectively) and a kneading time of 2 minutes), after which the obtained product was extruded through a T-die.

As a result, an extruded product having a good surface condition was obtained.

Next, the extruded product was hot-pressed into a uniform film (thickness: 500 µm), after which a solvent (tetrahydrofuran) was used to selectively remove the PLLA phase.

The sample obtained according to the above process was fractured at the liquid nitrogen temperature and the fractured surface was observed using a SEM. FIG. 4 shows the results.

The samples produced at 300 rpm are defined as low-shear samples in this Specification. When the samples produced at this low shear speed were examined, they had the tendency to quickly shrink in size regardless of the added amount of clay, thereby making it impossible to control the size. On the other hand, it was found that under high shear conditions (especially at 2000 rpm or higher speeds), the dispersion condition (especially the distribution at the interface) of clay in the PBS phase could be controlled using the added amount of filler and shear conditions (clay was omnipresent in the PBS phase), and as a result these conditions could be used as parameters to control the "pore" size in a desired manner.

EXAMPLE 2

A PLLA/PBS blend at a ratio of 55/45 was mixed with 8 percent by weight of clay and a sample produced in the same manner as in Example 1 was fractured at the liquid nitrogen temperature and the fractured surface was observed using a SEM. FIG. 5 shows the observation result of the fractured surface of each sample.

In low-shear kneading (screw rotation speed: 300 rpm), the porous phase size remained the same and never changed compared to when the clay content was 2%. In high-shear kneading (screw rotation speed: 1000, 2000 rpm), the porous phase size decreased in proportion to the added amount of clay.

In this case, the samples produced at 300 rpm are also defined as low-shear samples in this Specification. When the samples produced at this low shear speed were examined, they had the tendency to quickly shrink in size regardless of the added amount of clay, thereby making it impossible to control the size. On the other hand, it was found that under high shear conditions (especially at 2000 rpm or higher speeds), the dispersion condition (especially the distribution at the interface) of clay in the PBS phase could be controlled using the added amount of filler and shear conditions (clay was omnipresent in the PBS phase), and as a result these conditions could be used as parameters to control the "pore" size in a desired manner.

EXAMPLE 3

A PLLA/PBS blend at a ratio of 55/45 was mixed with 0 to 12% of clay and a sample produced in the same manner as in Example 1 was fractured at the liquid nitrogen temperature and the fractured surface was observed using a SEM. FIGS. 6A and 6B summarizes how the porous phase size changed based on observation results.

In the figures, lines a, b and c indicate the results at 300 rpm, 1000 rpm and 2000 rpm, respectively.

As evident from FIGS. 6A and 6B, in high-shear kneading (screw rotation speed: 2000 rpm) the porous phase size increased to as much as 30 to 40 μm by adding clay by only 1%. This is probably due partly to a significant change in the resin viscosity achieved by adding a small amount of clay, and partly to a change in the interfacial tension between constituent polymers also achieved by adding clay.

Actually, the porous phase size decreased rapidly as the added amount of clay was further increased.

Also as evident from the figures, the porous phase size decreased rapidly in low-shear kneading (screw rotation speed: 300 rpm) until the clay content reached 2%, but adding clay further did not affect the size.

On the other hand, the porous phase size could be controlled more effectively through addition of clay when the conditions were adjusted closer to those corresponding to high-shear kneading (screw rotation speed: 1000, 2000 rpm).

In an embodiment of the present invention, an optimal method can also be provided for use in technical fields where optical materials and electronic/electrical materials requiring a co-continuous structure are created, wherein such method is so simple as to simply melt-knead the ingredients using a micro-volume, high-shear molding machine equipped with an internal-feedback screw.

The sample amount was adjusted to approx. 5 g in the examples. However, it can be increased as the production scale increases. Also, kneading can be performed at high temperatures up to 500° C. by installing a high-temperature seal.

In the examples, industrial polymers were used as materials. However, the present invention is also expected to play a significant role in the research of substances for dispersing chemical substances of poor solubility for use in drug manufacturing.

The present invention includes the above mentioned embodiments and other various embodiments including the following:

1) A melt-kneading method for filling material and incompatible resin or elastomer, characterized by comprising: introducing a filling material as a filler and an incompatible resin or elastomer into a material feed part provided at an end of a melt-kneading part having a heater at a cylinder with a screw; feeding from a rear end to a front end of the screw the resin or elastomer that has been melt-kneaded under the conditions of 600 to 3000 rpm in the rotation speed of the screw and 900 to 4500 sec$^{-1}$ in shear rate, to trap the resin or elastomer in a space at the front screw end; and moving the resin or elastomer from the space to the rear screw end for circulation.

2) A melt-kneading method for filling material and incompatible resin or elastomer, characterized by comprising: introducing a filling material as a filler and an incompatible resin or elastomer into a material feed part provided at an end of a melt-kneading part having a heater at a cylinder with a screw; feeding from a rear end to a front end of the screw the incompatible resin or elastomer and the filling material as a filler that have been melt-kneaded under the conditions of 600 to 3000 rpm in the rotation speed of the screw, 900 to 4500 sec$^{-1}$ in shear rate, and a heating temperature roughly corresponding to the glass transition temperature or above in the case of an elastomer or amorphous polymer, or roughly near the melting point in the case of a crystal polymer, to trap the resin or elastomer and the filling material as a filler in a space that is provided between the front screw end and a sealed part positioned opposite the front end and adjustable to a range of 0.5 to 5 mm; and moving the resin or elastomer and the filling material as a filler to the rear screw end through a hole with an inner diameter of 1 to 5 mm provided at a center of the screw.

3) A melt-kneading method for filling material and incompatible resin or elastomer according to 1) or 2), characterized in that the filling material is added by 0.001 to 30 percent by weight relative to 100 percent by weight of the incompatible resin or elastomer.

4) A melt-kneading method for filling material and incompatible resin or elastomer according to any one of 1) to 3), characterized in that the incompatible resin or elastomer is a blend of thermoplastic resins, blend of a thermoplastic resin and a natural rubber, synthetic rubber or thermoplastic elastomer, or blend of natural rubbers, synthetic rubbers or thermoplastic rubbers.

5) A melt-kneading method for filling material and incompatible resin or elastomer according to any one of 1) to 3), characterized in that the blend of incompatible thermoplastic resins is based on a combination of biodegradable fatty acid polyesters or copolymers thereof, selected from polylactic acid (PLLA), polyglycolic acid (PGA), polybutylene succinate (PBS), copolymer of PBS and succinic acid (PBSA), poly(ε-caprolactone) (PCL) or polybutylene adipate butylene terephthalate copolymer (PBAT).

6) A melt-kneading method for filling material and incompatible resin or elastomer according to 5), characterized in that the blend of thermoplastic resins is based on a PLLA/PBS (or PBSA) blend being a blend of biodegradable fatty acid polyesters or copolymers thereof.

7) A melt-kneading method for filling material and incompatible resin or elastomer according to 5), characterized in that the blend of incompatible thermoplastic resins contains 70 to 30 percent by weight of a biodegradable fatty acid polyester of PLLA or copolymer thereof, and 30 to 70 percent by weight of a biodegradable fatty acid polyester of PBS or copolymer thereof.

8) A melt-kneading method for filling material and incompatible resin or elastomer according to any one of 1) to 3), characterized in that the filling material is selected from a fine clay particle selected from layer silicates (clays) and synthetic micas, or fine silica particle or caged silica.

9) A melt-kneading method for filling material and incompatible resin or elastomer according to any one of 1) to 7), characterized in that the filling material is a layer silicate (clay).

10) A melt-kneaded product obtained by a melt-kneading method for filling material and incompatible resin or elastomer or any blend thereof according to any one of 1) to 9) above, characterized in that said melt-kneaded product is a composition whose co-continuous structured is controlled in a desired manner at mesoscopic level.

11) A molding method for filling material and incompatible resin or elastomer characterized by performing molding successively following a melt-kneading method for filling material and incompatible resin or elastomer according to any one of 1) to 9) above.

12) A molding method for filling material and incompatible resin or elastomer according to 11), characterized in that the filling material is added by 0.01 to 30 percent by weight relative to 100 percent by weight of the resin or resin blend.

13) A molding method for filling material and incompatible resin or elastomer according to 11), characterized in that the filling material is a fine clay particle selected from layer silicates (clays) and synthetic micas, or a fine spherical or caged silica particle.

14) A molding method for filling material and incompatible resin or elastomer according to any one of 11) to 13), characterized in that the filling material is a layer silicate (clay).

15) A molded resin product characterized by being obtained by a molding method according to any one of 11) to 14) above.

16) A molded resin product according to 15), characterized by having a rod, film, sheet or fiber shape.

17) A molded resin product according to 15), characterized by having a micro-structure comprising PLLA and PBS (or PBSA) phases mutually forming continuous phases (so-called "co-continuous structure").

18) A molded resin product according to 15), characterized by having a micro-structure comprising PLLA and PBS (or PBSA) phases mutually forming a co-continuous structure and one of the phases is removed using a solvent, etc., after the co-continuous structure has been formed, in order to form a mesoporous structure.

19) A molded resin product according to 15), characterized in that the size of its mesoporous structure can be controlled in a desired manner in a range of 0.3 to 100 μm using the added amount of clay, shear speed and screw rotation speed as parameters.

20) A molded resin product according to 15), characterized in that its mesoporous structure comprises a biodegradable resin.

21) A substance permeation membrane or separation membrane material using a molded resin product according to any one of 15) to 20) above.

22) A gradual substance release material using a molded resin product according to any one of 15) to 20) above.

23) A support material for cell culturing using a molded resin product according to any one of 15) to 20) above.

The present application claims priority to Japanese Patent Application No. 2007-164489, filed Jun. 22, 2007, and No. 2008-120781, filed May 2, 2008, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:
1. A method for preparing a composition having a mesoporous structure using incompatible resins and filler, comprising:
   (a) supplying incompatible resins and filler into a cylinder for melt-kneading from a material feed port of the cylinder provided at the rear end of a feedback screw installed in the cylinder;
   (b) feeding the incompatible resins and filler from the rear end of the screw to the front end of the screw by rotating the screw while melt-kneading the incompatible resins and filler in the cylinder by rotating the screw, wherein the rotation speed of the screw is about 600 rpm to about 3,000 rpm and its shear rate is about 900 to about 4,500 sec−1, thereby forwarding the incompatible resins and filler to a sealed part of the cylinder;
   (c) trapping the incompatible resins and filler in a space formed between the sealed part and the front end of the screw of the cylinder;
   (d) returning the incompatible resins and filler toward the rear end of the screw through a lateral hole made in the center of the screw;
   (e) repeating steps (b) to (d) to circulate the incompatible resins and filler which have been melted and kneaded, thereby uniformly dispersing the filler in the incompatible resins to form a co-continuous structure of the incompatible resins, the size of which structure is controlled at a mesoscopic level (0.3 to 100 μm); and
   (f) removing one phase of the co-continuous structure to form a mesoporous structure comprised of another phase.

2. The method according to claim 1, wherein in the melt kneading step, a continuous phase size of the co-continuous structure is controlled using the added amount of the filler and screw rotation speed or shear rate as control parameters.

3. The method according to claim 1, wherein the incompatible resins includes an amorphous polymer or a crystalline polymer, and in the melt kneading step, the temperature condition is set to the glass transition temperature or above for the amorphous polymer, or roughly near the melting point for the crystalline polymer, and the incompatible resins and filler are trapped in the space that is provided between the front screw end, after which the incompatible resins and filler are moved to the rear screw end through a hole with an inner diameter of 1 to 5 mm provided at a center of the screw.

4. The method according to claim 1, wherein the filler is added by 0.001 to 30 percent by weight relative to 100 percent by weight of the incompatible resins.

5. The method according to claim 1, wherein the incompatible resins are a combination of thermoplastic resins, a combination of a thermoplastic resin and a natural rubber, synthetic rubber or thermoplastic rubber, or a combination of natural rubbers, synthetic rubbers, or thermoplastic rubbers.

6. The method according to claim 5, wherein the combination of incompatible thermoplastic resins is based on any combination of biodegradable aliphatic polyesters or copolymers thereof, said aliphatic polyesters being selected from the group consisting of polylactic acid (PLLA), polyglycolic acid (PGA), polybutylene succinate (PBS), copolymer of PBS and succinic acid (PBSA), poly(ecaprolactone) (PCL) and polybutylene adipate butylene terephthalate copolymer (PBAT).

7. The method according to claim 6, wherein the combination of thermoplastic resins is a combination of PLLA and PBS (or PBSA) as the blend of biodegradable aliphatic polyesters or copolymers thereof.

8. The method according to claim 6, wherein the combination of incompatible thermoplastic resins contains 70 to 30 percent by weight of PLLA or a copolymer thereof, and 30 to 70 percent by weight of PBS or a copolymer thereof.

9. The method according to claim 1, wherein the filler is selected from the group consisting of layer silicates (clays), a fine clay particle selected from synthetic mica, fine silica particle, and caged polysilsesquioxane (POSS).

10. The method according to claim 9, wherein the filler is a layer silicate (clay).

11. A melt-kneaded product obtained by the method of claim 1, wherein the size of the co-continuous structure is controlled at the mesoscopic level.

12. A molded resin product obtained by the method of claim 1, comprising incompatible resins and filler uniformly dispersed in the incompatible resins wherein a co-continuous structure of the incompatible resins, the size of which structure is controlled at a mesoscopic level (0.3 to 100 µm), is formed, and one phase of the co-continuous structure is removed wherein a mesoporous structure comprised of another phase of the co-continuous structure is formed.

13. The molded resin product according to claim 12, wherein micro-sized PLLA and PBS (or PBSA) phases mutually form the co-continuous structure.

14. The molded resin product according to claim 12, wherein the mesoporous structure is formed by having, as a micro-meter structure, PLLA and PBS (or PBSA) phases mutually forming a co-continuous structure, followed by removing one of the phases using a solvent.

15. The molded resin product according to claim 12, wherein the size of the mesoporous structure is controlled in a range of 0.3 to 100 µm.

16. A substance permeation membrane or separation membrane material using the molded resin product of claim 12.

17. A gradual substance release material using the molded resin product of claim 12.

18. A support material for cell culturing using the molded resin product of claim 12.

19. The molded resin product according to claim 1, wherein its mesoporous structure is constituted by a biodegradable resin.

* * * * *